United States Patent
Yamada et al.

(10) Patent No.: US 10,133,159 B2
(45) Date of Patent: Nov. 20, 2018

(54) PROJECTION TYPE IMAGE DISPLAY DEVICE AND ANTIVIBRATION DEVICE FOR PROJECTION LENS USED THEREIN

(71) Applicant: MAXELL, LTD., Kyoto (JP)

(72) Inventors: Hidemi Yamada, Kyoto (JP); Shinro Inui, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/746,280

(22) PCT Filed: Jul. 23, 2015

(86) PCT No.: PCT/JP2015/070998
§ 371 (c)(1),
(2) Date: Jan. 19, 2018

(87) PCT Pub. No.: WO2017/013794
PCT Pub. Date: Jan. 26, 2017

(65) Prior Publication Data
US 2018/0210326 A1    Jul. 26, 2018

(51) Int. Cl.
*G03B 21/14* (2006.01)
*G02B 13/16* (2006.01)

(52) U.S. Cl.
CPC ........... *G03B 21/142* (2013.01); *G02B 13/16* (2013.01)

(58) Field of Classification Search
CPC .............................. G03B 21/14; G03B 21/142
See application file for complete search history.

(56) References Cited

U.S. PATENT DOCUMENTS

| | | | |
|---|---|---|---|
| 2003/0112416 A1* | 6/2003 | Kan | G03B 21/22 353/74 |
| 2005/0099607 A1* | 5/2005 | Yokote | H04N 5/7416 353/43 |
| 2005/0250281 A1 | 11/2005 | Ufert et al. | |
| 2008/0180804 A1* | 7/2008 | Suzuki | G02B 9/12 359/649 |

(Continued)

FOREIGN PATENT DOCUMENTS

| | | |
|---|---|---|
| JP | 2005-128506 A | 5/2005 |
| JP | 2005-352293 A | 12/2005 |
| JP | 2006-084781 A | 3/2006 |

(Continued)

OTHER PUBLICATIONS

International Search Report for PCT/JP2015/070998 A1, dated Oct. 13, 2015.

*Primary Examiner* — William C Dowling
(74) *Attorney, Agent, or Firm* — Volpe and Koenig, P.C.

(57) ABSTRACT

Provided is a projection type image display device including an antivibration device 4 suppressing a vibration of a projection lens 2. The antivibration device 4 includes an antivibration base fixed to a display device body 1 and a friction sliding mechanism 8 provided on the antivibration base. The friction sliding mechanism 8 attenuates a vibration of the projection lens 2 by causing a lens-side sliding member 14 moving in synchronization with the projection lens 2 and a base-side sliding member 11 corresponding to a part of the antivibration base to contact each other in a pressed state so that both sliding members 14 and 11 frictionally slide on each other.

11 Claims, 15 Drawing Sheets

(56) References Cited

U.S. PATENT DOCUMENTS

2008/0218037 A1\* 9/2008 Adachi ............... H04N 9/3105
312/10.1

FOREIGN PATENT DOCUMENTS

| | | |
|---|---|---|
| JP | 2008-170594 A | 7/2008 |
| JP | 2008-250281 A | 10/2008 |
| JP | 2011-133520 A | 7/2011 |
| JP | 2012-027324 A | 2/2012 |

\* cited by examiner

FIG. 9
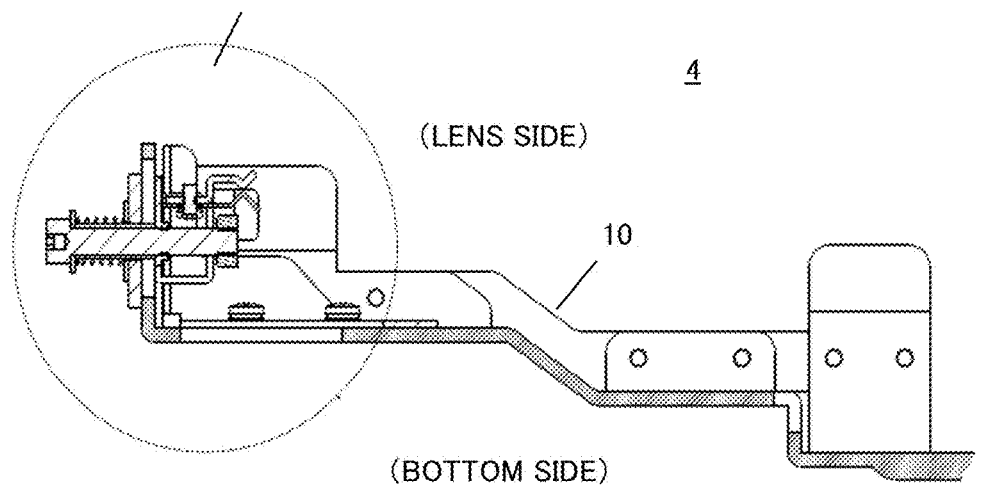
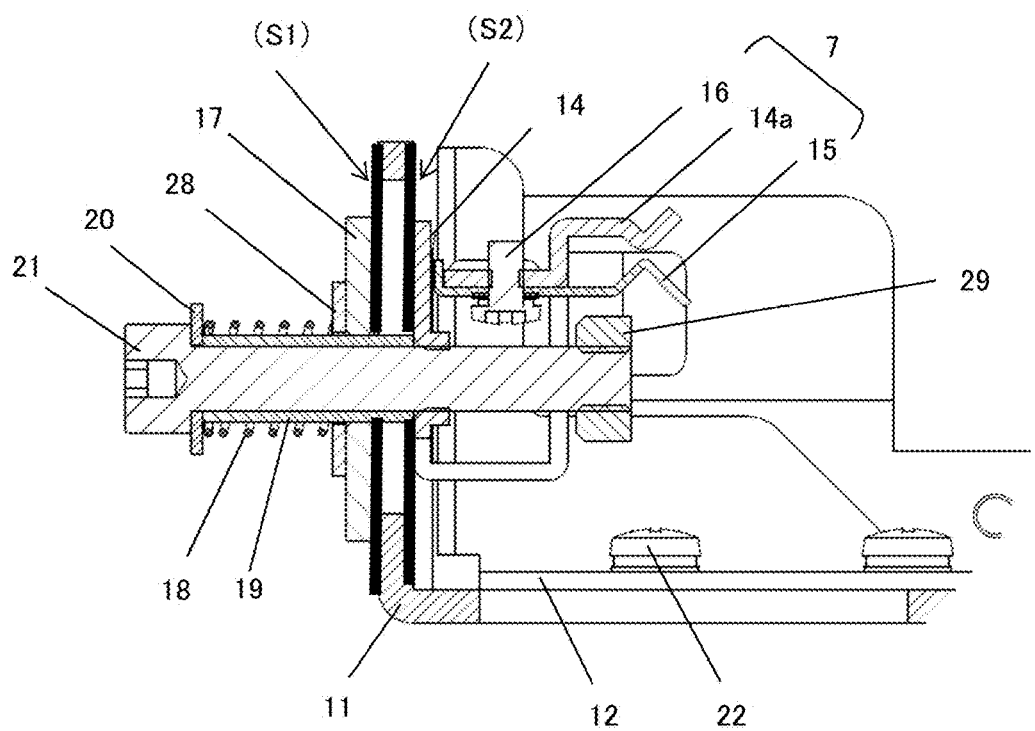

F I G. 1 1 A
CASE NOT HAVING VIBRATION-PROOF MECHANISM
(COMPARATIVE EXAMPLE)
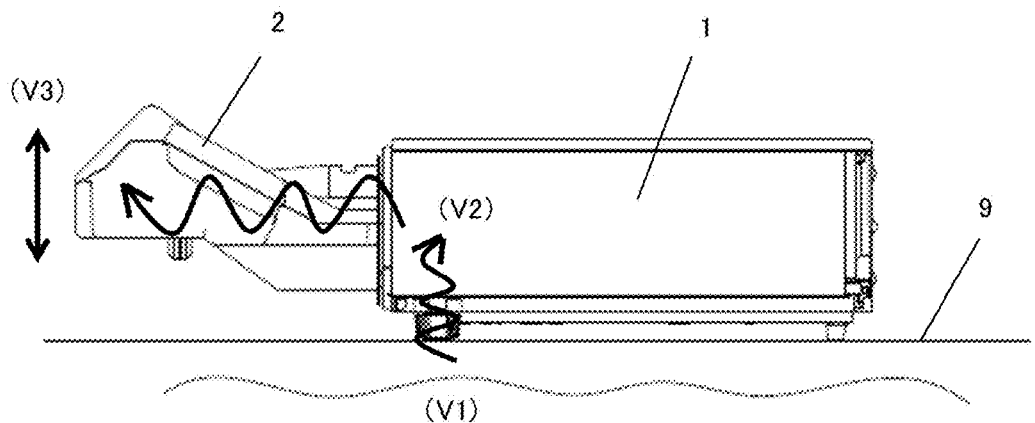
F I G. 1 1 B
CASE NOT HAVING VIBRATION-PROOF MECHANISM
(COMPARATIVE EXAMPLE)
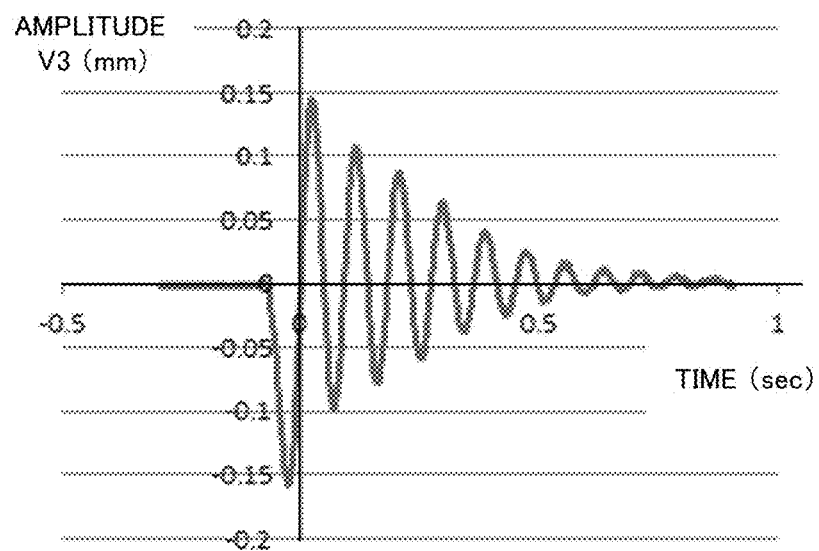

F I G. 1 2 A
CASE HAVING VIBRATION-PROOF MECHANISM
(EMBODIMENT)
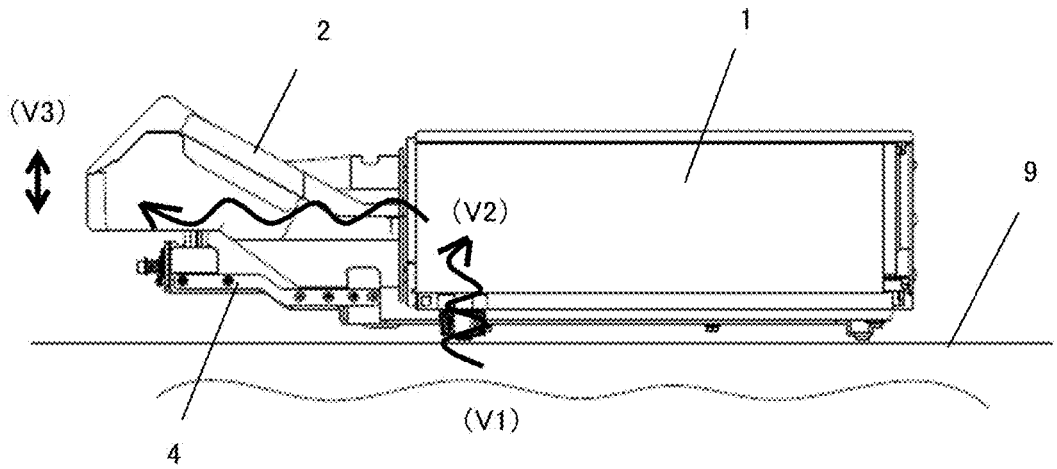
F I G. 1 2 B
CASE HAVING VIBRATION-PROOF MECHANISM
(EMBODIMENT)
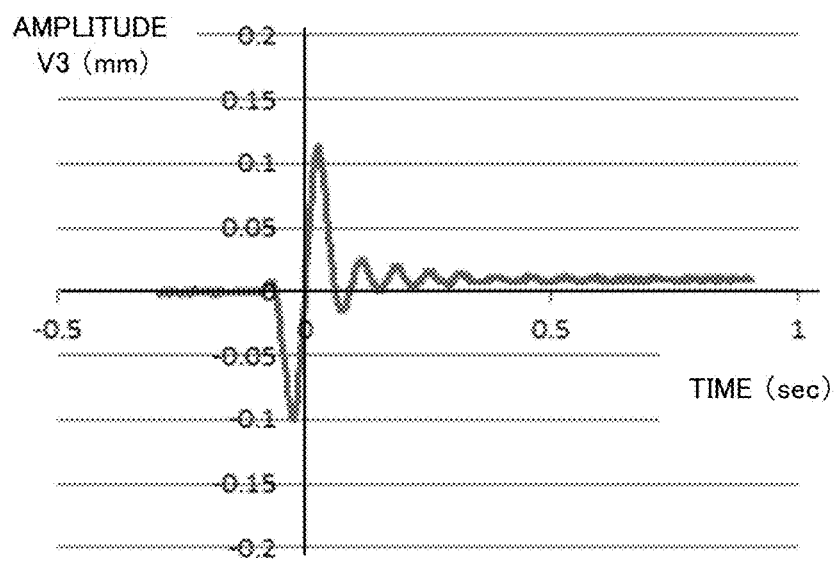

TILT ADJUSTMENT COUNTERMEASURE

SHIFT ADJUSTMENT
COUNTERMEASURE

F I G. 15B
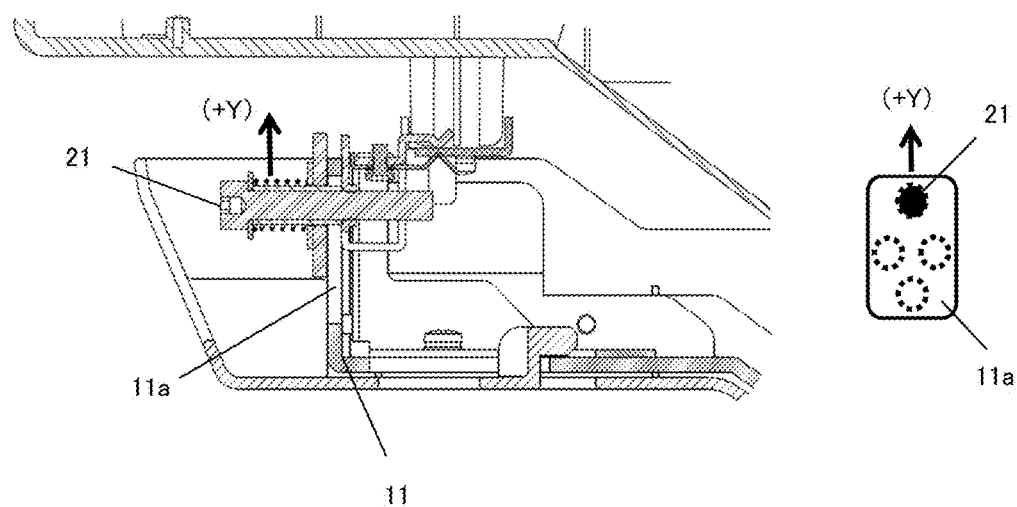
F I G. 15C
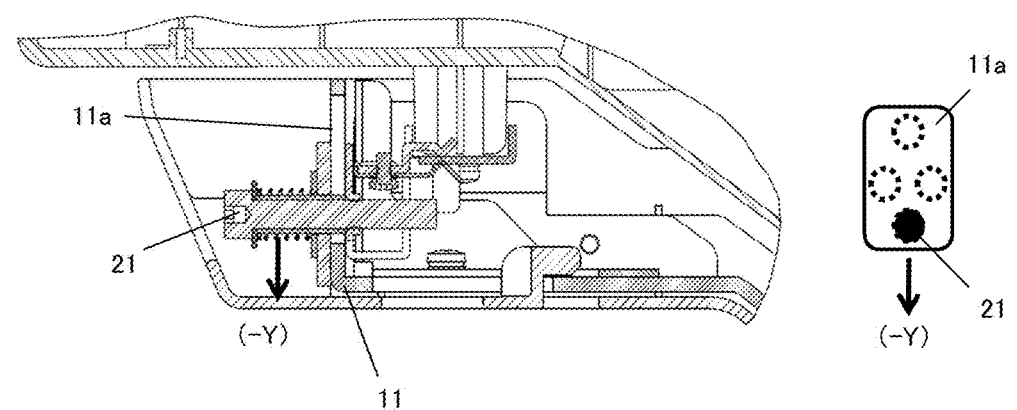

FIG. 16
(+Y) SHIFT CASE
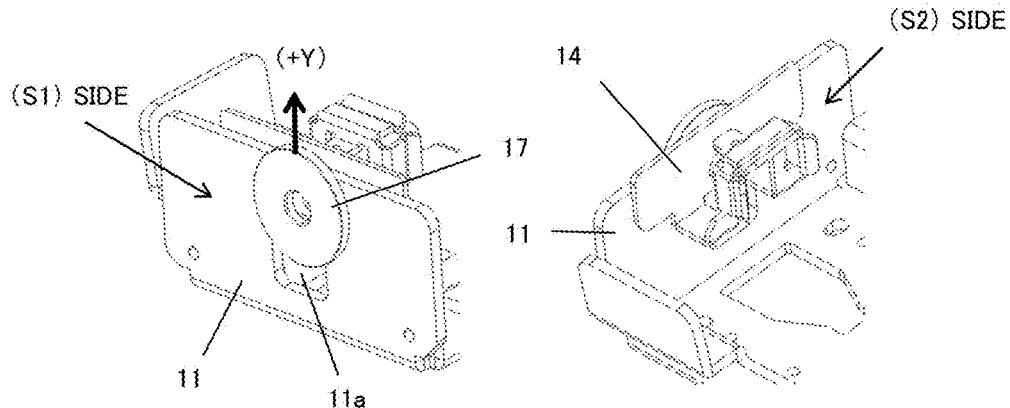
(-Y) SHIFT CASE
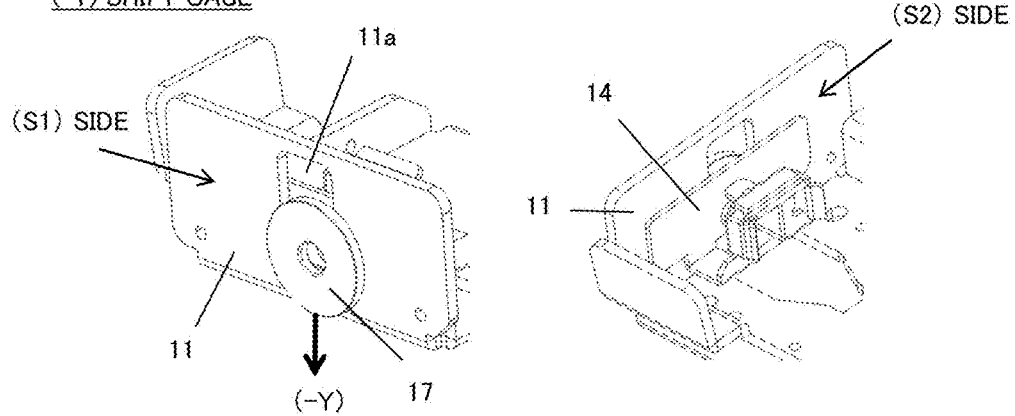

F I G. 1 7
(a) LENS INTEGRATED SLIDING MEMBER 30
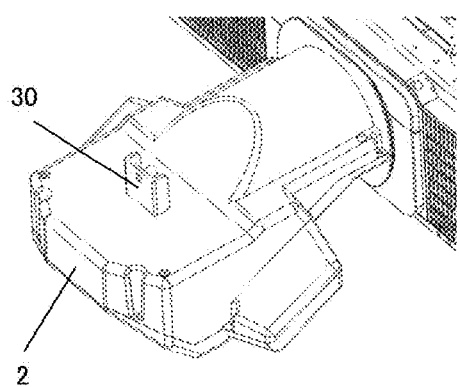
(b) ATTACHMENT OF VIBRATION-PROOF DEVICE
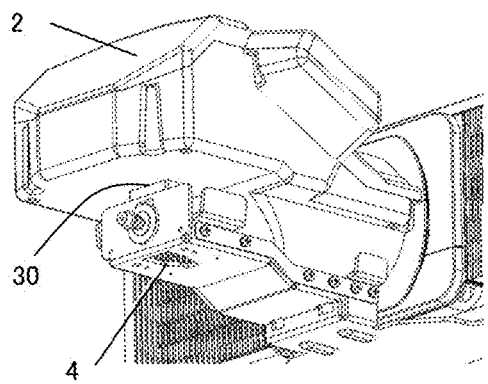
(c) CROSS-SECTION OF SLIDING MECHANISM
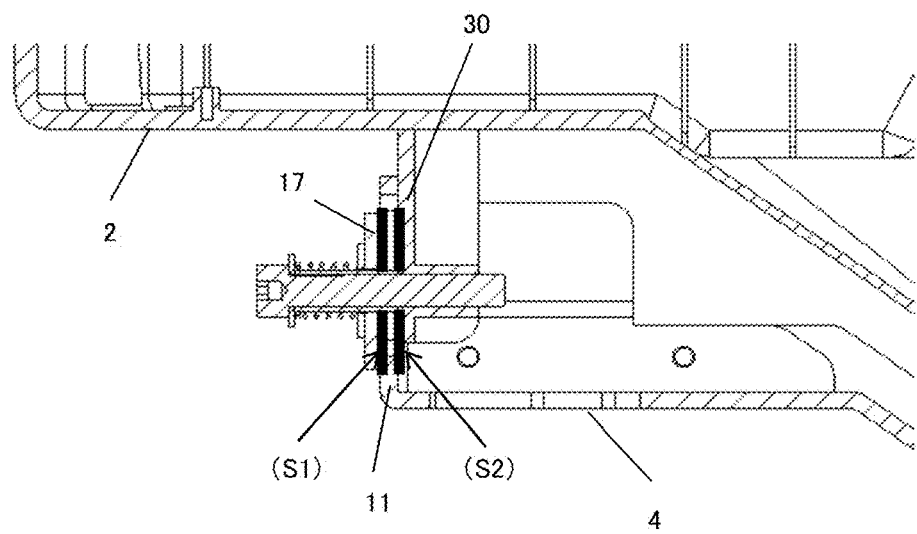

PROJECTION TYPE IMAGE DISPLAY DEVICE AND ANTIVIBRATION DEVICE FOR PROJECTION LENS USED THEREIN

TECHNICAL FIELD

The present invention relates to a projection type image display device and an antivibration device for a projection lens used therein.

BACKGROUND ART

In a projection type image display device (a projector) which projects an image onto a screen or the like, an image formed by a display element of a liquid crystal panel or the like is projected onto a screen or the like while being enlarged by a projection lens. For that reason, when the projection lens is vibrated, the shaking of the image projected onto the screen is displayed in an enlarged state. Thus, a problem arises in that an image quality is deteriorated and the image is visually undesirable.

As a technique of preventing the shaking of the projection image, Patent Document 1 discloses a configuration in which a focusing lens portion and a rack portion are mechanically separated from each other and an elastic member is interposed in a separation portion in order to prevent the shaking of an image on a screen caused by a vibration of a lens device due to an impact generated when a focusing motor starts to rotate.

CITATION LIST

Patent Document

Patent Document 1: JP 2011-133520 A

SUMMARY OF THE INVENTION

Problems to be Solved by the Invention

When a projection distance to a screen is largely changed due to an installation state of the projection type image display device, the projection lens is used by attaching a short or long focal option lens thereto instead of a standard lens. Especially in the case of the short focal option lens (an ultra-short projection lens or the like), since various projection sizes are handled with a short projection distance, the lens portion increases in size and weight. For that reason, when a certain impact is applied from the outside, the impact is transmitted to the projection lens through a projector body so that the projection lens causes a vibration (self resonance). In order to suppress a self vibration of such a projection lens, it is effective to improve the rigidity of the attachment portion between the projector body and the projection lens. However, since the projector increases in size on the whole, a manufacturing cost increases. Further, a mechanism for adjusting a projection position or a projection direction with respect to the screen (for a shift adjustment or a tilt adjustment of a lens) is assembled to the attachment portion of the projection lens. Since such an adjustment mechanism is adjusted by using a spring force, a countermeasure for improving the rigidity is difficult and a vibration easily occurs in the projection lens.

The screen shaking preventing structure disclosed in Patent Document 1 is used to prevent a vibration of the lens device caused by an impact generated at the time of driving the focusing motor. Thus, the self vibration of the projection lens generated by the impact applied to the projector body is not considered and the vibration mode is also different. Further, in Patent Document 1, the elastic member such as a rubber or a spring is used to attenuate a vibration. However, in order to efficiently operate such an elastic member, the elastic member needs to be inserted in a pressed and compressed state. At that time, since a configuration needs to be formed not to disturb the function of the lens adjusting mechanism, it is difficult to establish both the projection lens adjusting function and the projection lens antivibration function.

An object of the present invention is to provide a projection type image display device capable of efficiently attenuating a vibration of a projection lens without disturbing a projection lens adjusting function and an antivibration device for a projection lens used therein.

Solutions to Problems

According to the present invention, there is provided a projection type image display device for projecting an image while attaching a projection lens to a display device body, including: an antivibration device suppressing a vibration of the projection lens, in which the antivibration device includes an antivibration base fixed to the display device body and a friction sliding mechanism provided on the antivibration base, and the friction sliding mechanism attenuates a vibration of the projection lens by causing a lens-side sliding member moving in synchronization with the projection lens and a base-side sliding member corresponding to a part of the antivibration base to contact each other in a pressed state so that both sliding members frictionally slide on each other.

Further, according to the present invention, there is provided a projection lens antivibration device for suppressing a vibration of a projection lens attached to a projection type image display device, including: an antivibration base fixed to a body of the projection type image display device; and a friction sliding mechanism provided on the antivibration base, in which the friction sliding mechanism attenuates a vibration of the projection lens by causing a lens-side sliding member moving in synchronization with the projection lens and a base-side sliding member corresponding to a part of the antivibration base to contact each other in a pressed state so that both sliding members frictionally slide on each other.

Effects of the Invention

According to the present invention, it is possible to provide a projection type image display device capable of displaying a high-quality image by efficiently attenuating a vibration of a projection lens generated by an external impact and suppressing a shaking of a projection image. At that time, it is possible to provide a user-friendly device without disturbing a projection lens adjusting function such as a projection position or a projection direction.

BRIEF DESCRIPTION OF THE DRAWINGS

FIG. 9 is an enlarged cross-sectional view illustrating the friction sliding mechanism.

FIG. 11A is a diagram (a propagation path) illustrating a vibration of a projection lens when an antivibration mechanism is not provided.

FIG. 11B is a diagram (a vibration waveform) illustrating a vibration of a projection lens when an antivibration mechanism is not provided.

FIG. 12A is a diagram (a propagation path) illustrating a vibration of a projection lens when an antivibration mechanism is provided.

FIG. 12B is a diagram (a vibration waveform) illustrating a vibration of a projection lens when an antivibration mechanism is provided.

FIG. 15B is a diagram (in +Y direction) illustrating a position of a sliding portion fixing bolt after a shift adjustment.

FIG. 15C is a diagram (in -Y direction) illustrating a position of a sliding portion fixing bolt after a shift adjustment.

FIG. 16 is a diagram illustrating a contact state of a sliding surface during a shift adjustment.

FIG. 17 is a diagram illustrating a configuration of a projector using a lens integrated sliding member.

MODE FOR CARRYING OUT THE INVENTION

Hereinafter, embodiments of the present invention will be described with reference to the drawings.

First Embodiment

Figure 1:
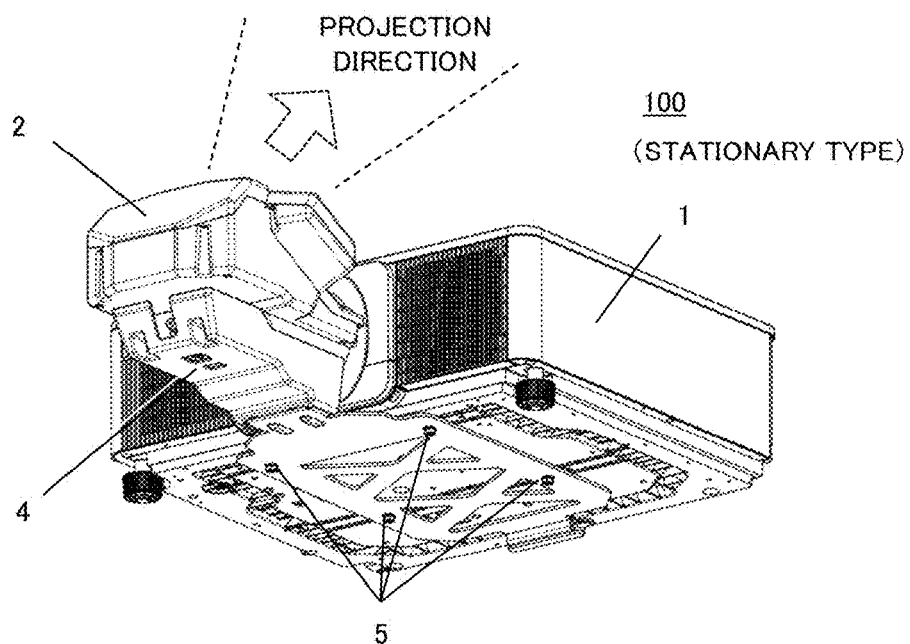
FIG. 1 is an external view (a stationary type) illustrating an example of a projector.
Figure 2:
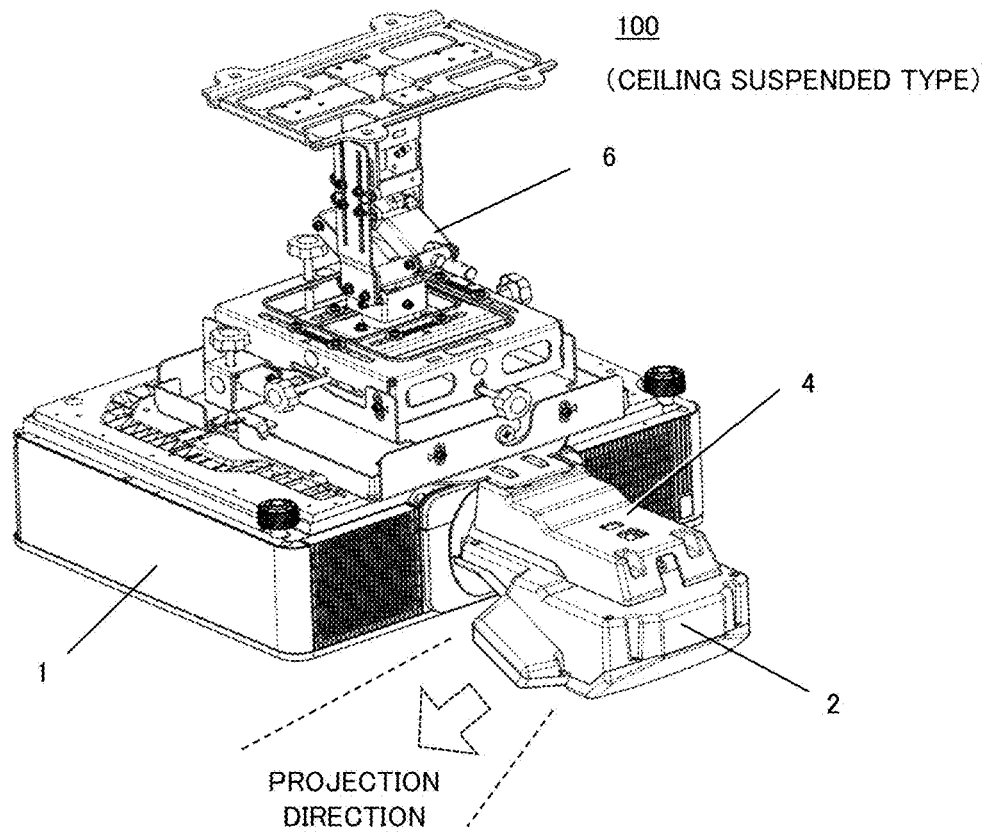
FIG. 2 is an external view (a ceiling suspended type) illustrating an example of a projector.

FIGS. 1 and 2 are external views illustrating an example of a projection type image display device (a projector). FIG. 1 is a diagram illustrating a case where the projection type image display device is used while being placed on a desk or the like (a stationary type) and FIG. 2 is a diagram illustrating a case where the projection type image display device is used while being suspended on a ceiling (a ceiling suspended type). A projection type image display device (a projector) 100 has a configuration in which a projection lens 2 is attached to a display device body (a projector body) 1 and a projection lens antivibration device (hereinafter, referred to as an antivibration device) 4 is attached thereto to prevent a vibration of the projection lens 2.

As in FIG. 1, the antivibration device 4 is attached and fixed to a bottom surface side of the projector body 1 by a screw 5. In the ceiling suspended type of FIG. 2, the projector body 1 having the antivibration device 4 attached thereto is attached to a ceiling or the like by a ceiling mount bracket 6. In any case, the common antivibration device 4 is used.

In the following example, the case of the stationary type will be described, but the case of the ceiling suspended type also has the same configuration even when the drawing is upside down. In the drawings, according to the installation direction of the stationary type, the side of the anti-vibration device 4 facing the projection lens 2 is described as the lens side and the opposite side is described as the bottom side.

Figure 3:
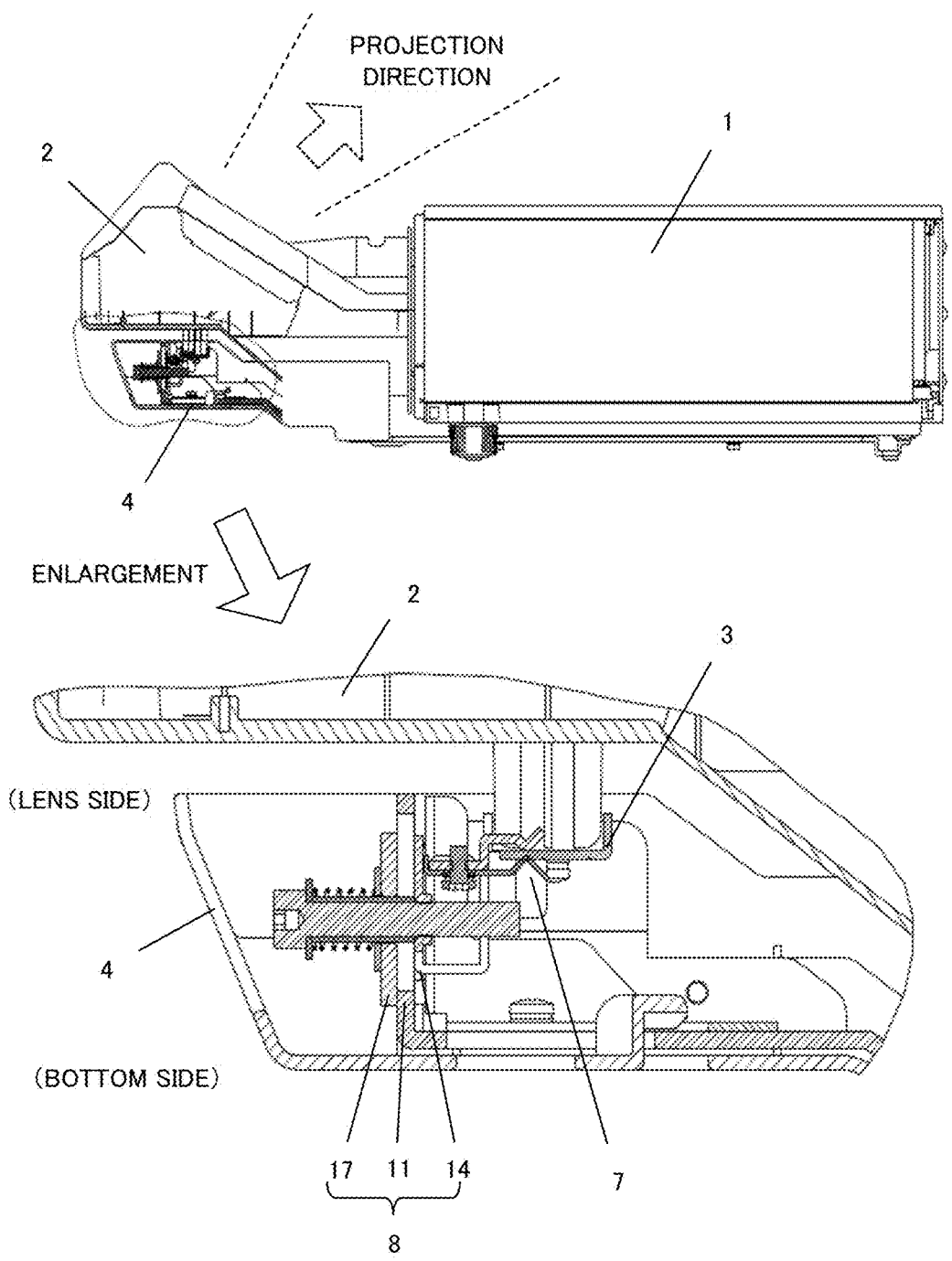
FIG. 3 is a side view illustrating a projector and a projection lens antivibration device.

FIG. 3 is a side view illustrating the projector and the projection lens antivibration device. Although not illustrated in the drawing, the projector body 1 accommodates components constituting the projection type image display device. For example, a display element (a transmissive liquid crystal panel, a reflective liquid crystal panel, a digital micromirror device (DMD)® panel, or the like) which is an element for generating an image to be projected, a light source (a high pressure mercury lamp, a xenon lamp, an LED light source, a laser light source, or the like) for generating illumination light for projection, an illumination optical system for conversing illumination light from the light source to more uniformly illuminate illumination light to a display element, a power supply unit for supplying electric power for operation to each unit such as a light source, a cooling unit for releasing heat generated by a light source or the like to the outside and suppressing a high temperature, an image input unit or an audio input unit for inputting an external image signal or audio signal, an audio output unit for outputting an input audio signal, a display element driving unit for sending a driving signal corresponding to an image signal to a display element, a memory unit for storing data at the time of controlling respective units, a control system for adjusting the projection lens 2 or controlling an operation of an entire device, and the like can be exemplified. However, there is no need to include all of the above-described configurations. Any configuration may be used as long as an image projecting function is provided.

The projection lens 2 has a plurality of lenses or/and mirrors stored in a lens holding portion and has a focusing function, a zooming function, and the like together with an enlarging projection function. Here, the case of an ultra-short projection lens which projects an image diagonally upward and in which a projection distance to a screen is short is described. In the case of the ultra-short projection lens, since an image plane adjustment such as curvature and blur at the end portion of the projection image is performed, the number of lenses is increased and the weight of the projection lens is increased.

The projection lens antivibration device 4 is a device which is disposed on a lower surface side of the projection lens 2 and attenuates the vibration of the projection lens 2. The inside of the antivibration device 4 is largely shown at the lower side of FIG. 3. The antivibration device 4 is fixed to the projector body 1 and a displacement (a vertical vibration) of the projection lens 2 is transmitted to the antivibration device 4 through a lens fixing member 3 attached to the projection lens 2. A fitting portion 7 is a portion which is connected to the lens fixing member 3 and receives a vibration of the projection lens 2. A movement of the lens fixing member 3 is transmitted to a lens-side sliding member 14 and a sliding washer 17 through the fitting portion 7 and the sliding member 14 and the sliding washer 17 is vibrated vertically in synchronization with the projection lens 2. Meanwhile, a base-side sliding member 11 inside the antivibration device 4 is a stationary portion connected to the projector body 1. A friction sliding mechanism 8 has a configuration in which the lens-side sliding member 14 and the sliding washer 17 sandwiches the base-side sliding member 11 in a pressed state. When the projection lens 2 is vibrated vertically, these sliding members cause a friction sliding so that the friction force becomes a braking force and a vertical vibration is attenuated.

Figure 4:
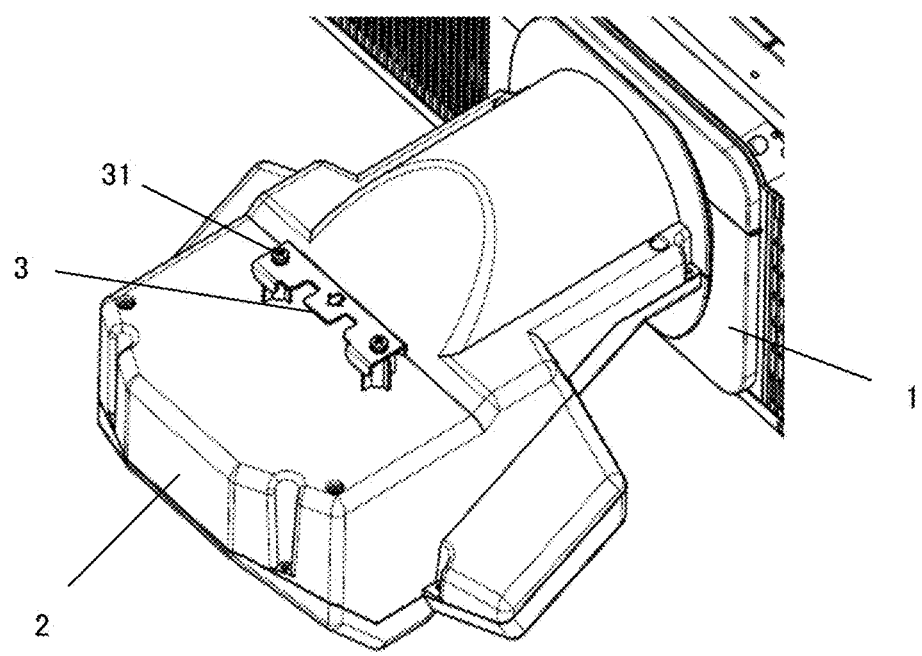
FIG. 4 is a diagram illustrating an attachment structure of a projection lens and an antivibration device.

FIG. 4 is a diagram illustrating an attachment structure of the projection lens and the antivibration device. The lens fixing member 3 is attached to a surface on the side of the antivibration device 4 in the projection lens 2 by a screw 31. A protrusion of the lens fixing member 3 is formed in a shape in which the protrusion is insertable into the fitting portion 7 of the antivibration device 4.

Hereinafter, a structure of the antivibration device 4 will be described in detail.

Figure 5:
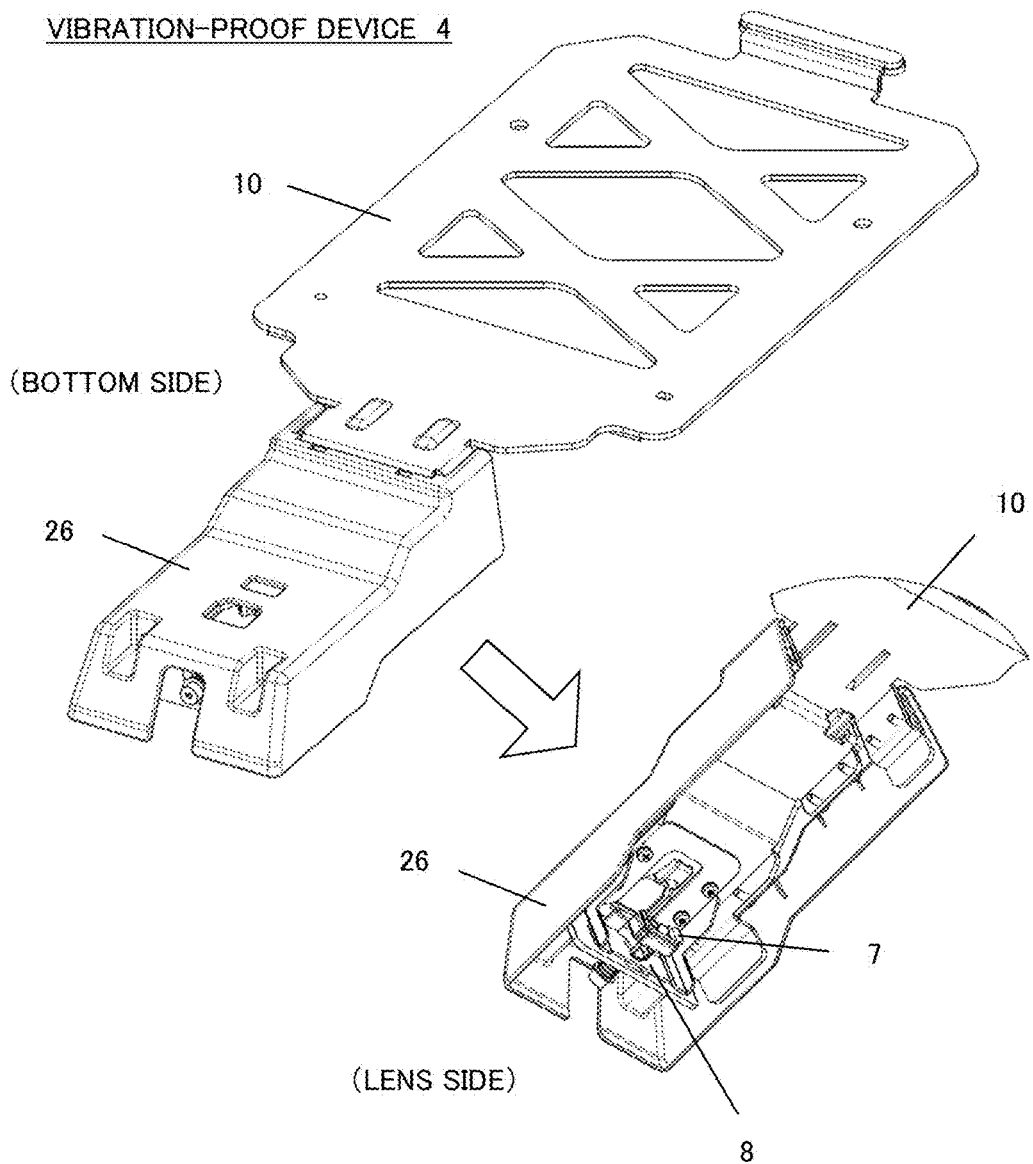
FIG. 5 is an external view illustrating the antivibration device.

FIG. 5 is an external view illustrating the antivibration device. The antivibration device 4 has a configuration in which the antivibration base 10 is provided with the fitting portion 7 and the friction sliding mechanism 8 and a cover 26 is attached to a bottom surface side. In the antivibration base 10, a portion fixed to the bottom surface of the projector body 1 and a portion equipped with the fitting portion 7 or the friction sliding mechanism 8 are integrally formed with each other.

Figure 6:
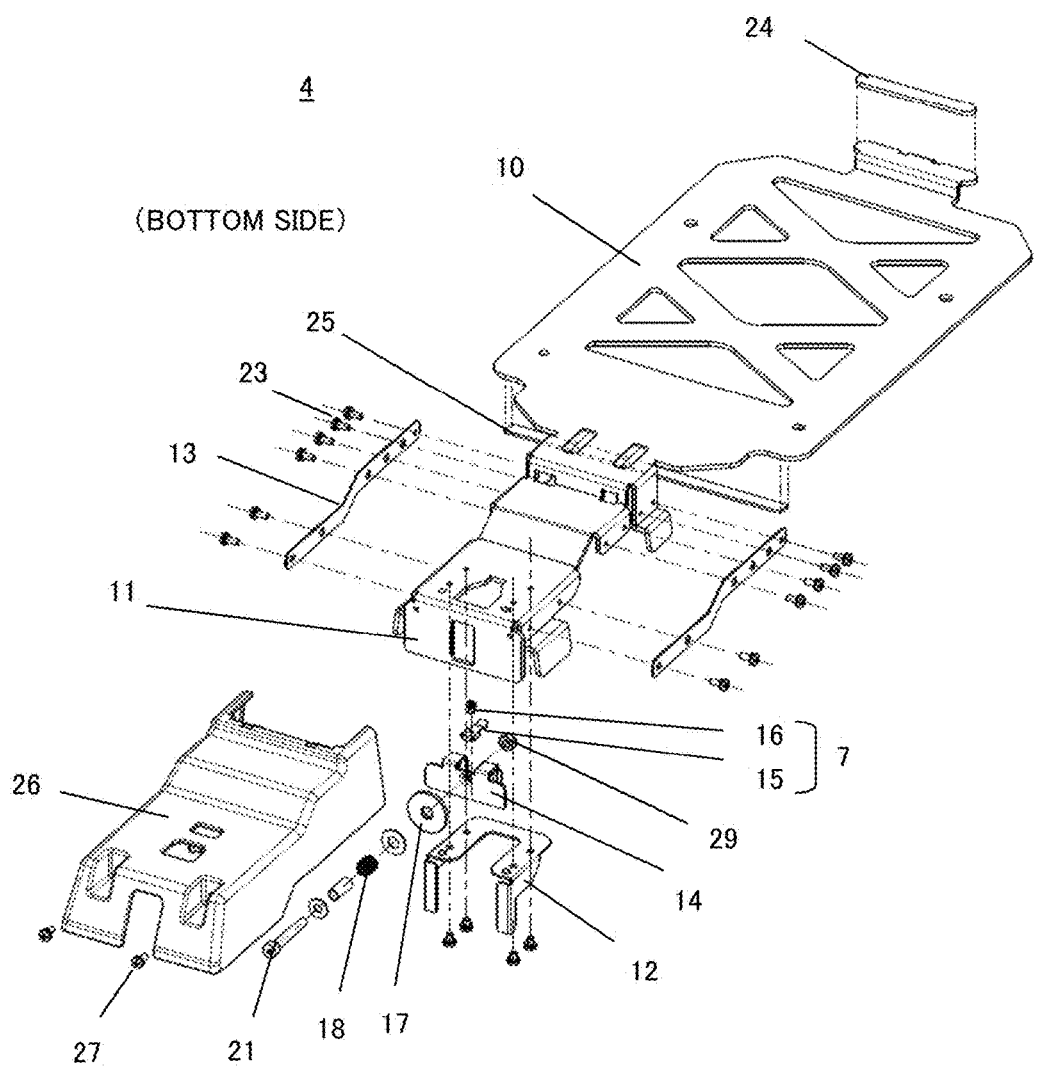
FIG. 6 is an exploded view illustrating parts of the antivibration device.

FIG. 6 is an exploded view illustrating parts of the antivibration device. The antivibration device 4 mainly includes the antivibration base 10, a guide member 12, the lens-side sliding member 14, and the cover 26 which are formed of a metallic material. The antivibration base 10 includes the base-side sliding member 11 of which an end portion in the projection direction is bent in the vertical direction and a reinforcement member 13 is attached to both side surfaces of the antivibration base 10 by a screw 23 to improve the rigidity. Further, a rubber leg 24 or an antivibration rubber 25 is attached to the antivibration base 10 to suppress a vibration from the outside.

The sliding washer 17 and a friction adjusting spring 18 are integrally assembled to the lens-side sliding member 14 by a sliding portion fixing bolt 21 and a nut 29 so that the lens-side sliding member is attached to be slidable with respect to the base-side sliding member 11. Further, a fitting spring 15 and a spring fixing screw 16 serving as the fitting portion 7 are attached to the lens-side sliding member 14. The Guide member 12 is attached to the antivibration base 10 to regulate the movement of the lens-side sliding member 14. The cover 26 is attached to the antivibration base 10 by a screw 27.

Figure 7:
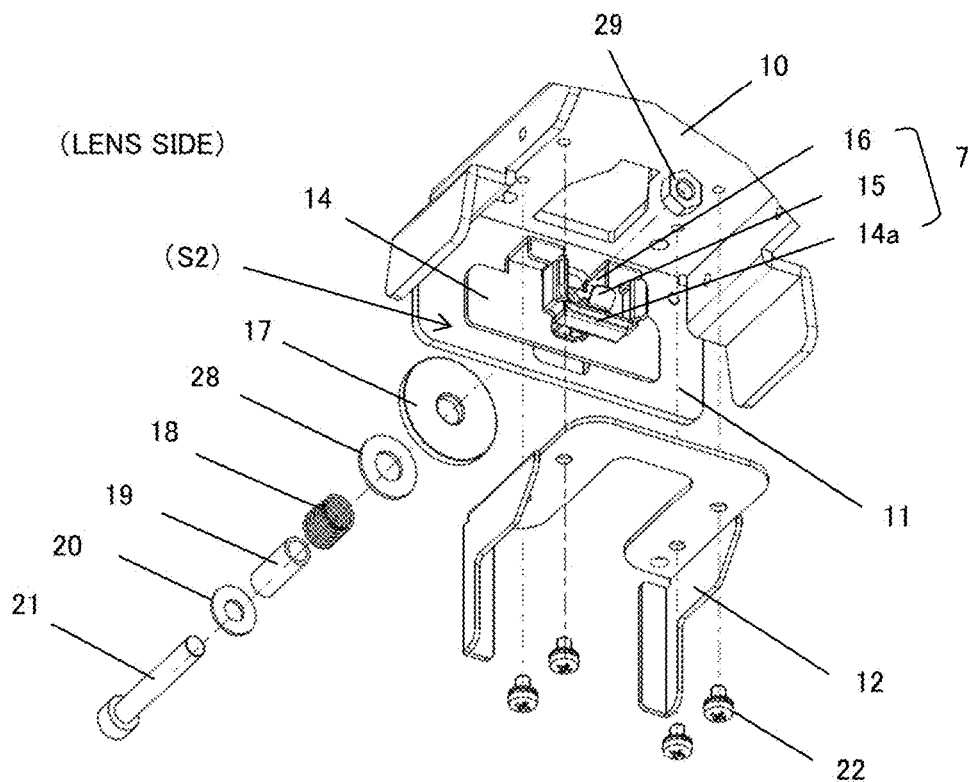
FIG. 7 is an enlarged exploded view illustrating a friction sliding mechanism.

FIG. 7 is an enlarged exploded view of the friction sliding mechanism. The lens-side sliding member 14 is disposed on the side of a sliding surface S2 at the inside of the base-side sliding member 11 of the antivibration base 10. A rear surface of the lens-side sliding member 14 is provided with an extension portion 14a of the sliding member 14 and the fitting spring 15 is attached to the extension portion by the spring fixing screw 16 to constitute the fitting portion 7. Meanwhile, a washer 20, a collar 19, the friction adjusting spring 18, a washer 28, and the sliding washer 17 are attached from the outside of the base-side sliding member 11 by the sliding portion fixing bolt 21 and the nut 29. The guide member 12 is attached to the side of the sliding surface S2 of the antivibration base 10 by a screw 22 to regulate the movement of the lens-side sliding member 14 in the vertical direction.

Figure 8:
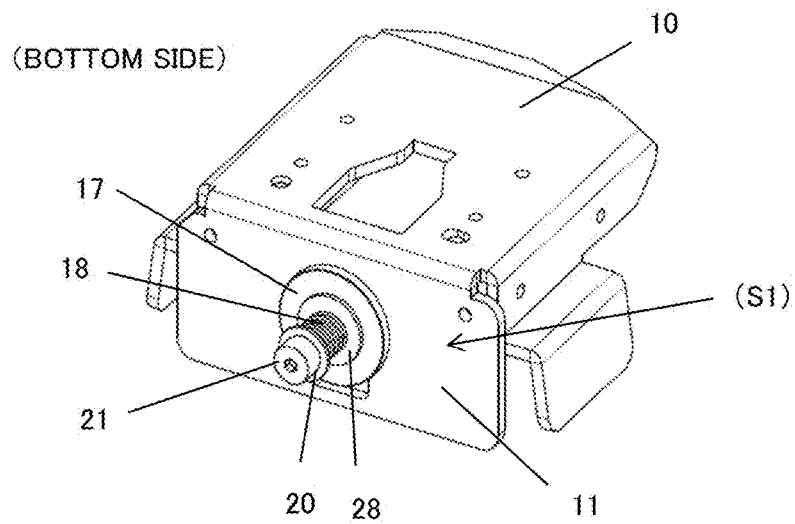
FIG. 8 is a diagram illustrating an assembly state of the friction sliding mechanism.

FIG. 8 is a diagram illustrating an assembly state of the friction sliding mechanism. The sliding washer 17 is disposed at an outer sliding surface S1 of the base-side sliding member 11 and is attached while being pressed by the friction adjusting spring 18.

FIG. 9 is an enlarged cross-sectional view of the friction sliding mechanism. In the friction sliding mechanism 8, the sliding washer 17 contacts the outer sliding surface S1 of the base-side sliding member 11 and the lens-side sliding member 14 contacts the inner sliding surface S2 of the base-side sliding member 11. The sliding washer 17 and the lens-side sliding member 14 are connected to each other by the sliding portion fixing bolt 21 and the nut 29 and the sliding surfaces S1 and S2 are pressed by the friction adjusting spring 18. At that time, when the collar 19 having a predetermined length is inserted into the sliding portion fixing bolt 21, it is possible to uniformly set a length of the friction adjusting spring 18, that is, a pressing force during an assembly. The fitting portion 7 which is provided at the rear surface of the lens-side sliding member 14 is connected to the lens fixing member 3 on the side of the projection lens 2 by the fitting spring 15 and the extension portion 14a of the sliding member.

Figure 10:
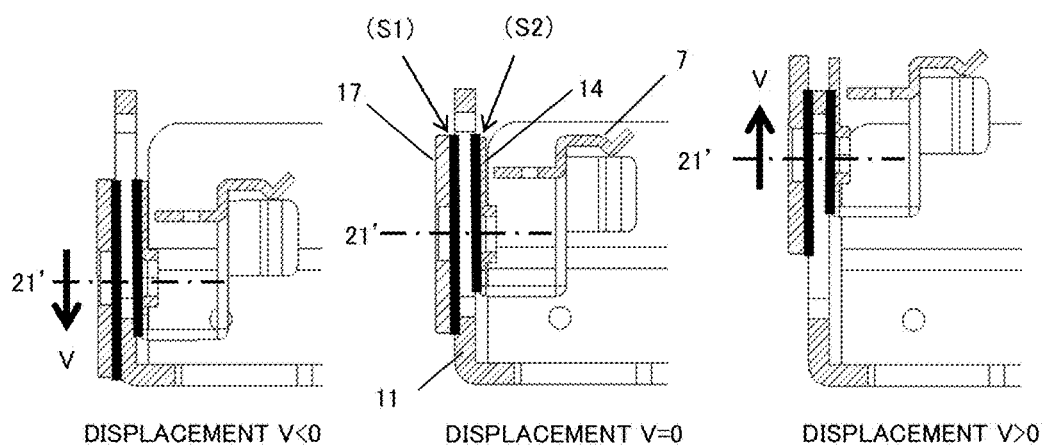
FIG. 10 is a diagram describing a friction sliding operation of the friction sliding mechanism.

FIG. 10 is a diagram describing a friction sliding operation of the friction sliding mechanism. An axial position of the sliding portion fixing bolt 21 is indicated by Reference Numeral 21'. When the projection lens 2 is displaced vertically, the lens-side sliding member 14 and the sliding washer 17 connected to the sliding portion fixing bolt 21 are displaced vertically in synchronization with the displacement. In the drawing, the case (V<0) of a downward displacement and the case (V>0) of an upward displacement are illustrated. The sliding washer 17 and the lens-side sliding member 14 are pressed against the base-side sliding member 11 by the friction adjusting spring 18. As a result, a friction force is generated in the sliding direction at the sliding surface S1 between the sliding washer 17 and the base-side sliding member 11 and the sliding surface S2 between the lens-side sliding member 14 and the base-side sliding member 11 and this friction force becomes a braking force so that a vertical displacement, that is, a vibration is attenuated. The friction force generated at this time is dependent on the friction coefficients of the sliding surfaces S1 and S2 and the pressing force of the friction adjusting spring 18. In order to allow the smooth movement of each sliding member, the sliding surfaces of the sliding members 11 and 14 or the sliding washer 17 may be formed as a smooth surface. Further, in order to obtain a desired friction coefficient, a surface treatment may be performed. Additionally, the antivibration device 4 (the antivibration base 10) moves together with the projection lens 2 in a state where the friction force is too large so that no sliding occurs at the sliding surface. Accordingly, it is not possible to expect an effect of suppressing the vibration of the projection lens 2 by causing a self vibration while both members are combined with each other.

Hereinafter, an effect of attenuating the vibration of the projection lens according to the embodiment will be described.

FIGS. 11A and 11B are diagrams illustrating the vibration of the projection lens in the case without the antivibration mechanism for comparison. FIG. 11A illustrates a vibration propagation path. When a vibration (an impact) V1 is applied to a desk 9 having a projector installed thereon, the vibration is propagated to the projector body 1 so that a vibration V2 is generated. Furthermore, the vibration is propagated to the projection lens 2 so that an enlarged self vibration V3 is generated and a projection screen is shaken. The self vibration V3 is an oscillating vibration which is set by the weight or length of the projection lens 2. FIG. 11B is a diagram illustrating a measurement example of a vibration waveform and illustrating the vibration waveform V3 of the projection lens 2 when a predetermined impact is given from the outside. In this example, a maximum amplitude was ±0.15 mm and a vibration continuation time was about 1 sec.

FIGS. 12A and 12B are diagrams illustrating a vibration of the projection lens when the antivibration mechanism of the embodiment is attached. FIG. 12A illustrates a vibration propagation path. Here, when the vibration (the impact) V1 is given to the desk 9 having the projector installed thereon, the vibration V2 of the projector body 1 and the self vibration V3 of the projection lens 2 are generated, but the vibration V3 is attenuated and decreased by the antivibration device 4. FIG. 12B illustrates a measurement example of a vibration waveform. Here, a maximum amplitude was ±0.1 mm (60%) and a vibration continuation time was decreased to 0.3 sec (30%). Accordingly, since the shaking amount of the projection screen is largely reduced and the shaking time is shortened, user's uncomfortable feeling can be eliminated.

Second Embodiment

In a second embodiment, an antivibration mechanism will be described in consideration of a tilt adjustment of a projection lens.

Figure 13:
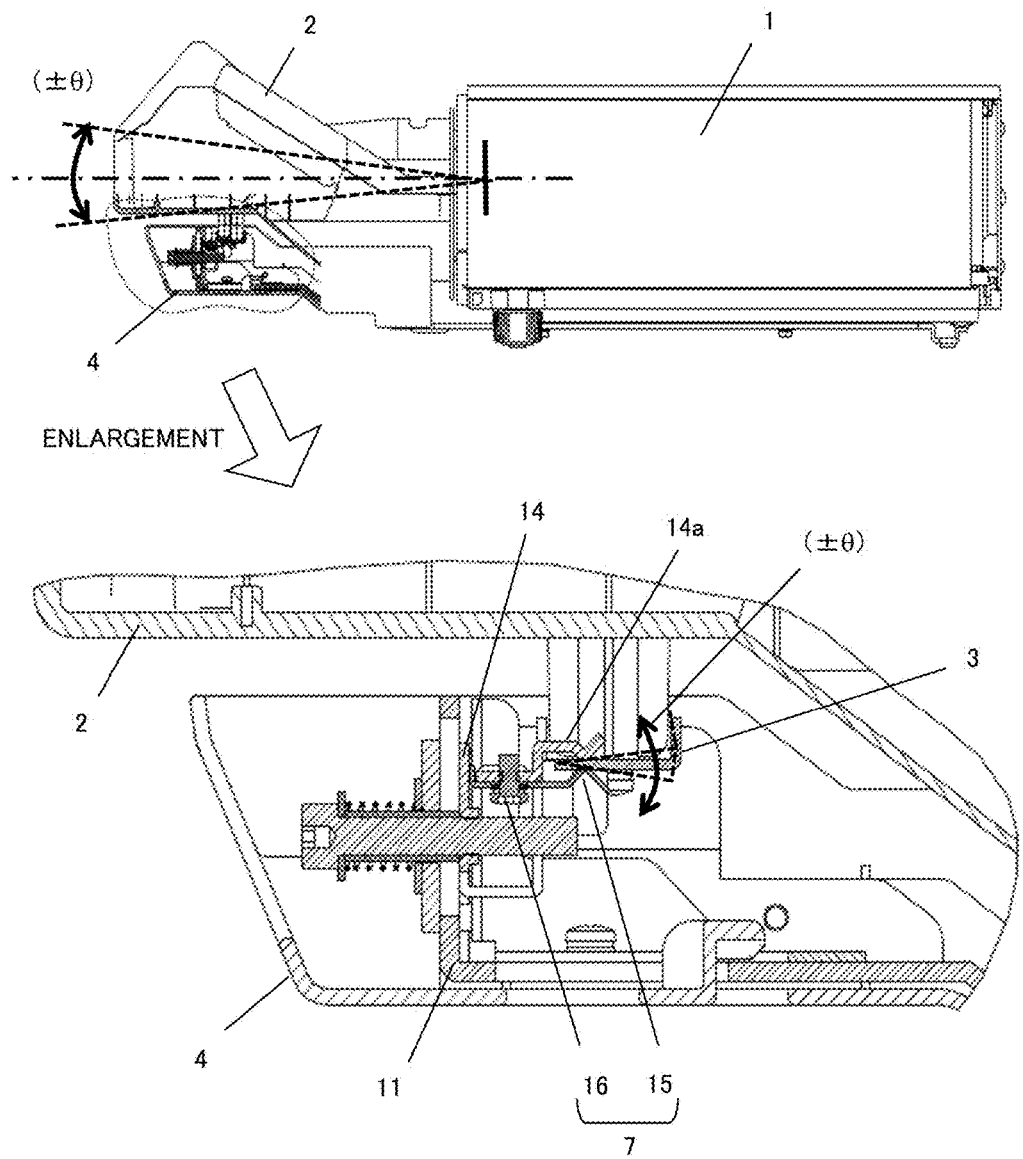
FIG. 13 is a diagram illustrating a configuration of an antivibration device corresponding to a tilt adjustment.

FIG. 13 is a diagram illustrating a configuration of an antivibration device corresponding to a tilt adjustment. A projector has a tilt adjusting function in order to adjust a projection direction (an elevation angle) of a projection lens 2 according to a screen position. Specifically, a tilting mechanism is provided at an attachment portion of a projector body 1 for attaching the projection lens 2 thereto and the projection lens 2 is rotatable only by ±θ in the vertical direction about a pivot point. When a posture (a direction) of the projection lens 2 is changed by a tilt adjustment, a posture of a lens fixing portion 3 attached to the projection lens 2 is also changed only by ±θ and an antivibration device 4 needs to handle this.

Here, in the antivibration device 4 of the embodiment, a fitting spring 15 and an extension portion 14a of a lens-side sliding member in the fitting portion 7 connected to the lens fixing portion are formed in a clip shape. Then, the protrusions having a clip shape sandwich the lens fixing portion 3 from both sides. That is, the extension portion 14a and the fitting spring 15 are held in a line-contact state with respect to the lens fixing portion 3 instead of a surface-contact state and can be stably held even when the lens fixing portion 3 is inclined in accordance with a tilt adjustment. Accordingly, since the vertical vibration of the projection lens 2 is reliably transmitted to the lens-side sliding member 14 without disturbing the tilt adjustment of the projection lens 2, the antivibration device 4 of the embodiment can obtain an effect of attenuating a vibration.

Third Embodiment

In a third embodiment, an antivibration mechanism will be described in consideration of a shift adjustment of a projection lens.

Figure 14:
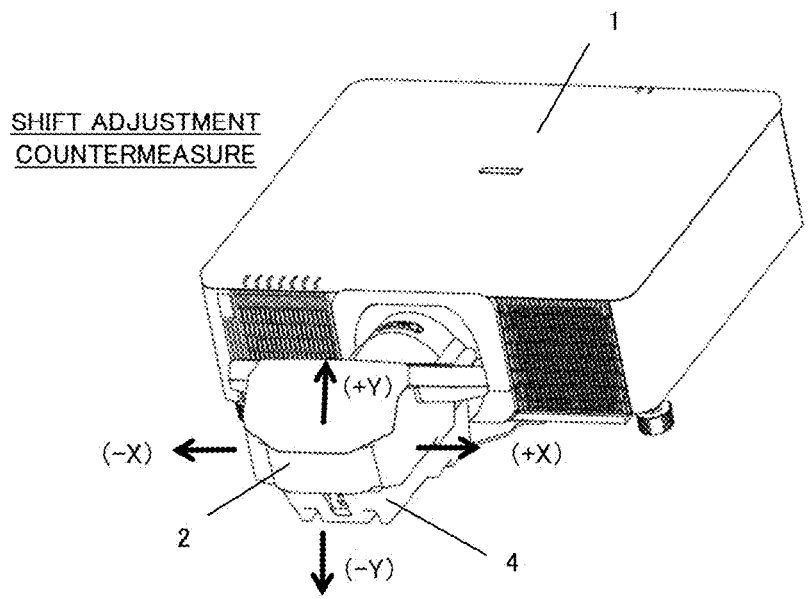
FIG. 14 is a diagram describing a shift adjusting function.

FIG. 14 is a diagram describing a shift adjusting function. A projector has a shift adjusting function of a projection lens 2 in order to adjust a projection position according to a screen position. Specifically, a shift mechanism is provided at an attachment portion of a projector body 1 for attaching the projection lens 2 thereto and the projection lens 2 is moved in parallel in vertical direction (±Y) and the horizontal direction (±X).

Figure 15A:
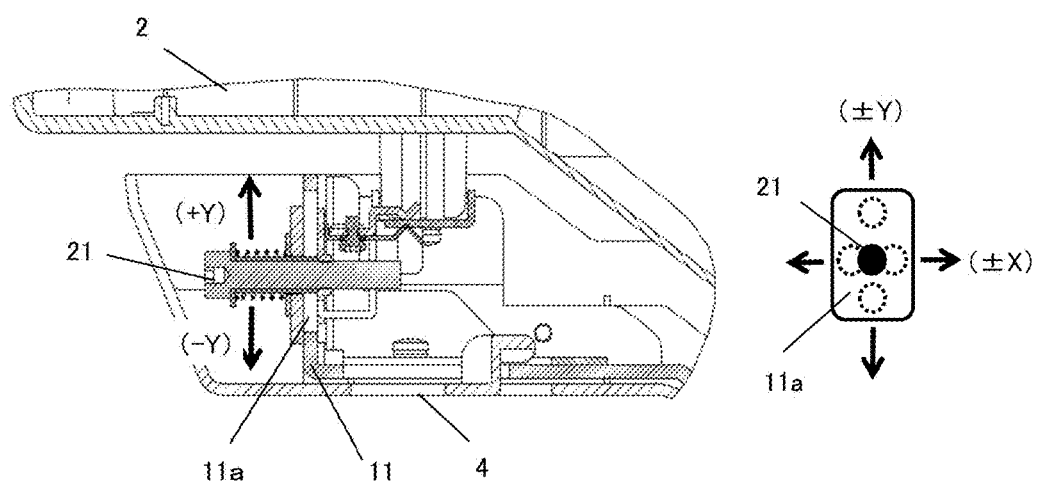
FIG. 15A is a diagram illustrating a configuration of an antivibration device corresponding to a shift adjustment.

FIG. 15A is a diagram illustrating a configuration of an antivibration device corresponding to a shift adjustment. When a vertical position (±Y) and a horizontal position (±X) of the projection lens 2 are changed by the shift adjustment, a position of a sliding portion fixing bolt 21 connected to a lens fixing portion 3 is also changed only by ±Y and ±X through the lens fixing portion 3 attached to the projection lens 2.

Here, in the antivibration device 4 of the embodiment, a sliding hole 11a is formed at a base-side sliding member 11 intersecting a sliding portion fixing bolt 21 according to the shift adjustment. A size of the sliding hole 11a is set to a size in which the sliding portion fixing bolt 21 is movable only by a shift adjustment amount ±Y and ±X and a vibration width of the projection lens 2 is added.

FIGS. 15B and 15C are diagrams illustrating a position of the sliding portion fixing bolt after the shift adjustment. FIG. 15B illustrates the case of a shift adjustment in the +Y direction and the fixing bolt 21 moves to the vicinity of the upper edge of the sliding hole 11a. FIG. 15C illustrates the case of a shift adjustment in the −Y direction and the fixing bolt 21 moves to the vicinity of the lower edge of the sliding hole 11a. In addition, the same applies to the case of the shift adjustment in the horizontal direction (±X) and the movement of the fixing bolt 21 is performed within the range of the sliding hole 11a.

FIG. 16 is a diagram illustrating a contact state of the sliding surface during the shift adjustment. Here, the sliding surfaces S1 and S2 in the case of the shifting in the up direction (+Y) and the down direction (−Y) are illustrated. In any shift position, the sliding washer 17 and the lens-side sliding member 14 contact the base-side sliding member 11 with a sufficient area and thus a necessary friction force can be generated. Accordingly, the antivibration device 4 of the embodiment can reliably attenuate the vertical vibration of the projection lens 2 without disturbing the shift adjustment of the projection lens 2.

Fourth Embodiment

In a fourth embodiment, a configuration in which a lens-side sliding member 14 of the first embodiment is integrated with a projection lens 2 will described.

FIG. 17 is a diagram illustrating a configuration of a projector using a lens integrated sliding member. FIG. 17(a) illustrates a state where a lens integrated sliding member 30 is attached to a side of an antivibration device 4 of the projection lens 2. The lens integrated sliding member 30 corresponds to the lens-side sliding member 14 of the first embodiment. FIG. 17(b) illustrates a state where the antivibration device 4 is attached to the lower side of the Projection lens 2 and FIG. 17(c) illustrates a cross-section of a sliding mechanism. The lens integrated sliding member 30 contacts a base-side sliding member 11 inside the sliding mechanism to form a sliding surface S2. The other sliding surface S1 is similar to the first embodiment and the sliding washer 17 and the base-side sliding member 11 contact each other. When the projection lens 2 is vibrated vertically, the lens integrated sliding member 30 is vibrated vertically together and a sliding washer 17 connected thereto is moved vertically. Accordingly, the vibration is attenuated by the friction forces generated in the sliding surfaces S1 and S2.

In the case of the embodiment, since one sliding member (Reference Numeral 30) is integrated with the projection lens 2, the antivibration device 4 may include one sliding member (Reference Numeral 11) and a sliding washer 17 and the fitting portion is not necessary. As a result, a configuration is simple.

According to the above-described embodiments, since the shaking of a projection image is suppressed by efficiently attenuating the vibration of the projection lens generated by an external impact, it is possible to provide a projection type image display device (a projector) displaying a high-quality image. At that time, since a projection lens adjusting function such as a projection position or a projection direction is not disturbed, it is possible to provide a user-friendly device.

Further, the present invention is not limited to the above-described embodiments and can be modified as below.

The antivibration device and the sliding member of each of the embodiments are formed of a metallic material, but may be partially formed of a resin material in order to decrease the weight thereof. Especially in the friction sliding surface, even when the metallic material is replaced by a resin material or an elastic material, a desired friction force can be obtained by performing an appropriate surface treatment.

The sliding mechanism of each of the embodiments includes two sliding surfaces S1 and S2, but may include only one sliding surface. For example, in the configuration of FIG. 9, if the sliding washer 17 is eliminated so that only the sliding surface S2 between the lens-side sliding member 14 and the base-side sliding member 11 is provided, a configuration including one sliding surface becomes simple. In contrast, three or more sliding surfaces may be provided to increase the friction force.

Additionally, in the above-described embodiments, an example in which the friction force is generated by a surface (S1 and/or S2) has been described, but the friction force can be also generated by two or more points, lines, or surfaces interposing the base-side sliding member 11 or a combination thereof.

REFERENCE SIGNS LIST

1: projector body (display device body),
2: projection lens,
3: lens fixing member,
4: projection lens antivibration device,
7: fitting portion,
8: friction sliding mechanism,
10: antivibration base,
11: base-side sliding member,
11a: sliding hole,
12: guide member,
14: lens-side sliding member,
14a: extension portion,
15: fitting spring,
16: spring fixing screw,
17: sliding washer,
18: friction adjusting spring,
19: collar,
21: sliding portion fixing bolt,
26: cover,
29: nut,
30: lens integrated sliding member,
100: projector (projection type image display device).

The invention claimed is:

1. A projection type image display device for projecting an image while attaching a projection lens to a display device body, comprising:
an antivibration device suppressing a vibration of the projection lens,
wherein the antivibration device includes an antivibration base fixed to the display device body and a friction sliding mechanism provided on the antivibration base, and
the friction sliding mechanism attenuates a vibration of the projection lens by causing a lens-side sliding member moving in synchronization with the projection lens and a base-side sliding member corresponding to a part of the antivibration base to contact each other in a pressed state so that both sliding members frictionally slide on each other.

2. The projection type image display device according to claim 1,
wherein in the friction sliding mechanism, a sliding washer is disposed at the opposite side to the lens-side sliding member with the base-side sliding member interposed therebetween and the sliding washer and the lens-side sliding member are connected to each other by a sliding portion fixing bolt and a friction adjusting spring and frictionally slide on base-side sliding member in a pressed state.

3. The projection type image display device according to claim 1,
wherein a lens fixing member transmitting a vibration to the antivibration device is attached to the projection lens, and
the antivibration device is provided with a fitting portion fitted to the lens fixing member and transmitting a movement of the lens fixing member to the lens-side sliding member.

4. The projection type image display device according to claim 3,
wherein in the fitting portion, a portion holding the lens fixing member is formed in a clip shape and the lens fixing member is held in a line-contact state even when a posture of the lens fixing member is inclined by a tilt adjustment of the projection lens.

5. The projection type image display device according to claim 2,
wherein the base-side sliding member is provided with a sliding hole allowing the sliding portion fixing bolt to pass therethrough, and
a size of the sliding hole is set to a size in which the sliding portion fixing bolt is movable by a shift adjustment of the projection lens.

6. A projection lens antivibration device for suppressing a vibration of a projection lens attached to a projection type image display device, comprising:
an antivibration base fixed to a body of the projection type image display device; and
a friction sliding mechanism provided on the antivibration base,
wherein the friction sliding mechanism attenuates a vibration of the projection lens by causing a lens-side sliding member moving in synchronization with the projection lens and a base-side sliding member corresponding to a part of the antivibration base to contact each other in a pressed state so that both sliding members frictionally slide on each other.

7. The projection lens antivibration device according to claim 6,
wherein in the friction sliding mechanism, a sliding washer is disposed at the opposite side to the lens-side sliding member with the base-side sliding member interposed therebetween and the sliding washer and the lens-side sliding member are connected to each other by a sliding portion fixing bolt and a friction adjusting spring and frictionally slide on the base-side sliding member in a pressed state.

8. The projection lens antivibration device according to claim 6, further comprising:

a fitting portion fitted to a lens fixing member attached to the projection lens and transmitting a movement of the lens fixing member to the lens-side sliding member.

9. The projection lens antivibration device according to claim 8, wherein in the fitting portion, a portion holding the lens fixing member is formed in a clip shape and the lens fixing member is held in a line-contact state even when a posture of the lens fixing member is inclined by a tilt adjustment of the projection lens.

10. The projection lens antivibration device according to claim 7, wherein the base-side sliding member is provided with a sliding hole for allowing the sliding portion fixing bolt to pass therethrough, and a size of the sliding hole is set to a size in which the sliding portion fixing bolt is movable by a shift adjustment of the projection lens.

11. A projection lens antivibration device for suppressing a vibration of a projection lens attached to a projection type image display device, comprising:

an antivibration base fixed to a body of the projection type image display device; and a friction sliding mechanism provided on the antivibration base, wherein the friction sliding mechanism attenuates a vibration of the projection lens by causing a lens integrated sliding member integrally attached to the projection lens and a base-side sliding member corresponding to a part of the antivibration base to contact each other in a pressed state so that both sliding members frictionally slide on each other.

\* \* \* \* \*